July 17, 1962  E. BOCK  3,044,336

CUTTING DEVICES FOR MOVING OBLONG WORKS

Filed June 2, 1958  2 Sheets-Sheet 1

INVENTOR

ERWIN BOCK

BY

*Imirie & Smiley*

ATTORNEYS

July 17, 1962   E. BOCK   3,044,336
CUTTING DEVICES FOR MOVING OBLONG WORKS
Filed June 2, 1958   2 Sheets-Sheet 2

INVENTOR

ERWIN BOCK

BY *Imirie & Smiley*

ATTORNEYS

United States Patent Office 3,044,336
Patented July 17, 1962

3,044,336
CUTTING DEVICES FOR MOVING
OBLONG WORKS
Erwin Bock, Aachen, Germany, assignor to Schumag Schumacher Metallwerke Gesellschaft mit beschränkter Haftung, Aachen, Germany
Filed June 2, 1958, Ser. No. 739,113
4 Claims. (Cl. 83—319)

This invention relates to cutting devices for axially moved oblong works, such as round or section bars, pipes and the like, the cutting tools of which are arranged on carriages driven synchronously with the work feeding means and are operated through lever systems from cams mounted on the stationary portion of the machine.

In cutting devices of this kind the pieces being separated from the work can only be kept at the accurate predetermined length, if the feeding movement of the work takes place without any slipping. Generally, this is not the case and more particularly not if the work is machined, e.g. cold drawn, during the feeding and the work feeding means simultaneously exert the required drawing force on the work.

Slipping of the work in the feeding means causes the work to lag behind the cutting device which is synchronously driven with the work feeding means so that the cutting device during its cutting action has to exert part or in case of considerable slipping even the whole force to be transmitted to the work for feeding it, whereby the cutting tool is quickly destroyed. Under these conditions it is impossible to use cutting tools, such as circular saws or cutting disks, which are liable to be easily affected by a relative longitudinal displacement of the work to be separated.

These drawbacks are obviated according to the invention by providing a cutting device of the kind in question, in which the cutting tool is rigidly connected with a clamping mechanism which is adapted to firmly engage the work during the cutting operation so as to prevent the work from displacing in its longitudinal direction relatively to the clamping mechanism, this mechanism being driven in synchronism with the work feeding means through yieldable transmission members.

A preferred embodiment of the device according to the invention comprises a carriage adapted to be moved to and fro in the longitudinal direction of the work and driven synchronously with the work feeding means, and an auxiliary carriage mounted on the main carriage for a limited movement against the action of springs in a sense opposite the feeding direction of the work, the said auxiliary carriage having mounted on it the cutting tool and the said work clamping mechanism.

Preferably, circular saws or cutting disks are used as cutting tools.

The cutting tools and the work clamping mechanism may be operated through levers from control cams fixed on the stationary portion of the machine.

An embodiment of a device according to the invention, as applied to a draw bench for metal wires, rods, pipes and the like, is hereinafter described and illustrated in the accompanying drawings.

Figure 1:
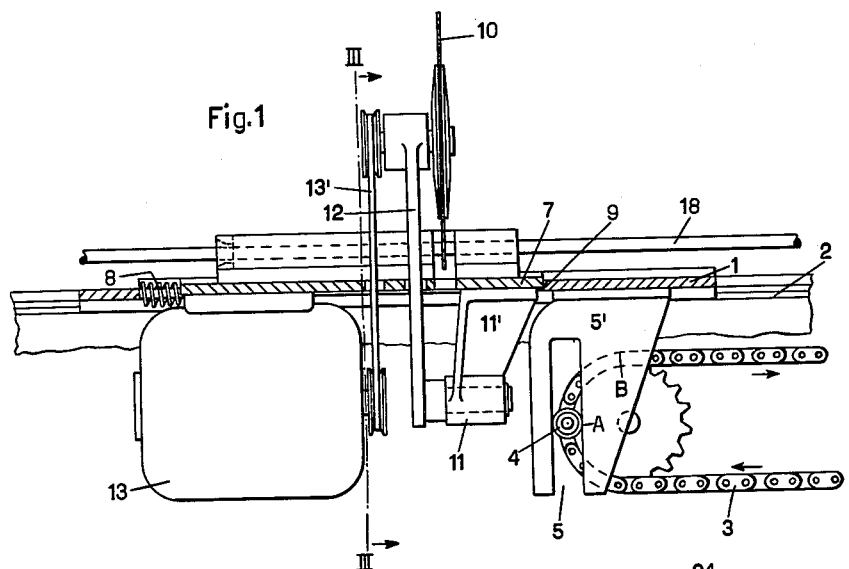
FIG. 1 is a longitudinal sectional elevation of the device on the line I—I of FIG. 2.

The draw bench, of which only a fractional portion of the frame is shown, may be of any conventional form and include any approved means, such as reciprocating drawing carriages with pliers, for feeding the oblong work through the bench and reducing it to the desired diameter.

The cutting device according to the invention comprises a carriage 1 which is mounted on the side walls 2 of the bench frame for reciprocating movement in the direction in which the work is fed through the bench. The carriage 1 has its reciprocating movement imparted to it by a positively driven endless chain 3 which by a roller 4 engages a guide slot 5 of a bracket 5' fixed to the underside of the carriage 1. The chain 3 and thereby the carriage 1 are moved in synchronism with the work feeding means of the bench.

The carriage 1 has a rectangular recess on the longitudinal edges of which guide rails 6 are provided between which an auxiliary carriage 7 is mounted for a limited to and fro movement. Springs 8 interposed between the main and the auxiliary carriage at the rear end usually force the auxiliary carriage into an inoperative position in which it bears against the forward edge 9 of the recess of the main carriage 1.

The auxiliary carriage 7 carries the cutting device, a work clamping mechanism and means for operating these devices.

The cutting tool consists of a circular saw or cutting disk 10 which is carried by an arm 12 tiltably mounted on a pivot pin 11 of a bracket 11' which is fixed to the underside of the auxiliary carriage 7. The saw or disk 10 is driven by a V-belt drive 13' from a motor 13 which is likewise fixed to the underside of the auxiliary carriage 7. The pivot pin 11 lies co-axially with the shaft of motor 13 so that in the tilting movements of the arm 12 there do not occur any changes in the length of the driving belt 13'. The cutting tool is operated by a cam 14 through a rod 15, which cam is fixed on the frame 2. Normally the cutting tool is held in inoperative position by a spring 16. The rod 15 is provided at its free end with a roller-equipped lever 17 which, while usually held in line with rod 15, can deflect in one direction. When the carriage 1 in its advance movement passes along the cam 14, this cam acts through the members 17 and 15 on the arm 12 to tilt it against the force of spring 16 towards the middle of the bench to an extent to cause the cutting tool 10 to separate the work 18. In the return movement of the carriage the lever 17 on passing over the cam 14 is deflected inwardly so as to leave the cutting tool inoperative.

The clamping mechanism for holding the work 18 against longitudinal movement relative to the tool 10 during the cutting operation comprises cooperating jaws consisting of one or more transversely adjustable prismatic bars 19 and a wedge 20 movable longitduinally along a counter-wedge 21. The said bars and wedges are mounted on the auxiliary carriage 7. The adjustment of the bars 19 is effected by means of set screws 22 in accordance with the diameter of the work. The pressure of the clamping mechanism on the work can be regulated by a set screw 23 which engages the counter-wedge 21. The clamping mechanism is actuated during the advance movement of the carriages 1 and 7 by a cam 24 through the intermediary of a system of levers 25, 26 and 27, which are linked to one another. The single lever 25 is equipped with a roller and pivoted to the end of the outer arm of the double-armed lever 26 the pivot 28 of which is mounted on the auxiliary carriage 7. The lever 25 is normally held in line with lever 26 and is adapted to be deflected in one direction only. The system of levers is set working when in the advance movement of the carriages 1 and 7 the roller-equipped lever 25 engages the cam 24. The lever 26 is then swung about its pivot 28 in the direction of the arrow indicated and its inner arm puts a spring 29 under tension and simultaneously swings the double-armed lever 27 about its pivot 30. In this swinging movement the free arm of the lever 27 through a spring 31 and an abutment 31' on the wedge 20 displaces this wedge rearwardly along the counter-wedge and thereby forces the former into firm engagement with the work 18 clamping same between it and the bars 19. As soon as the lever 25 has left the cam 24 the levers 25, 26, 27 and the wedge 20 are returned to their initial positions by the pressure of the spring 29, whereby the work 18 is released.

In as much as the operation of the device is not clear from what has been said above, it may be described as follows.

The work 18 is continuously fed by conventional feeding means, such as reciprocating drawing carriages, through the draw bench. When a predetermined length of the work has passed into or through the bench the chain drive 3 is set moving synchronously with the work feeding means by any approved means, not forming part of this invention, whereby the carriage 1 with its auxiliary carriage 7 is carried along in the same direction as the work by the roller 4 of the chain 3. On the path of the roller from A to B the movement of the carriage 1 is somewhat accelerated.

Figure 2:
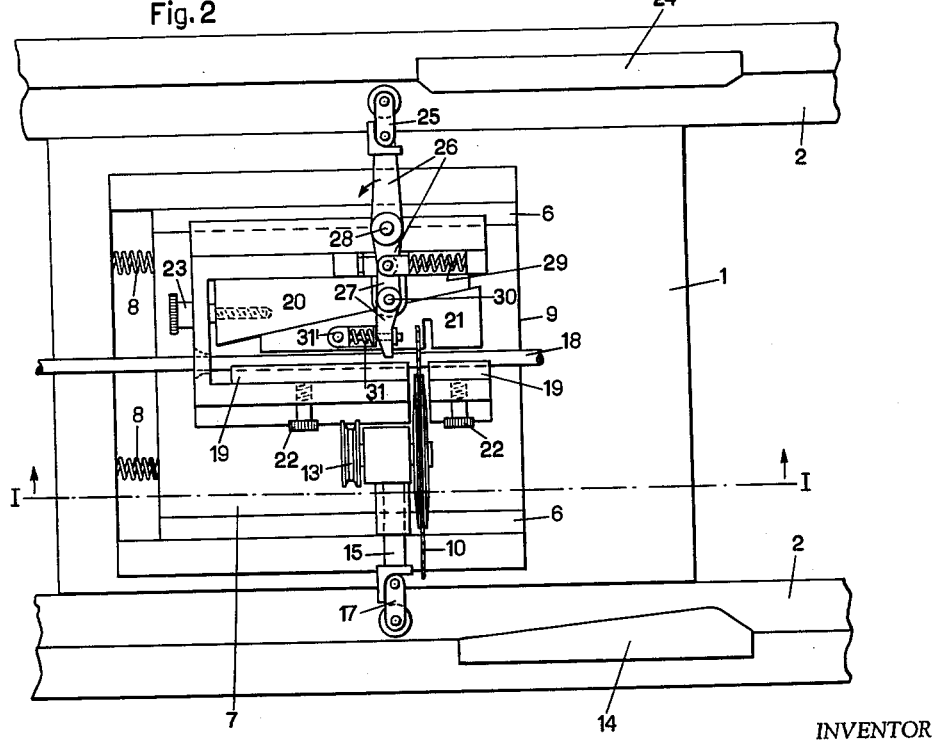
FIG. 2 is a plan view of the device.
Figure 3:
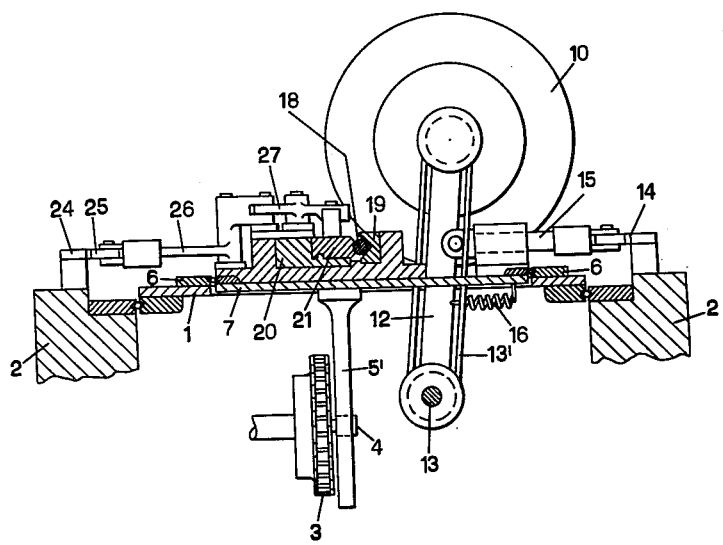
FIG. 3 is a transverse section of the device on the line III—III of FIG. 1.

During the advance of the carriages 1, 7 the lever 25 comes into engagement with the cam 24 and thereby causes the work 18 to be clamped between the bars 19 and the wedge 20, whereby the work is rigidly connected with the auxiliary carriage 7. If now there occurs any slipping of the work in the feeding means, this will not have any affect on the relative position between the work and the cutting tool, since this tool is fixed on the auxiliary carriage, which in turn is in firm engagement with the work. During such slipping the auxiliary carriage 7 lagging behind the main carriage 1 may move in the recess of the latter against the springs 8. When in the advance movement of the carriages the rod 15 with its lever 17 passes onto the cam 14 the arm 12 and the cutting tool 10 are tilted inwardly so that the work is separated. Since the work is held by the clamping mechanism head and in the rear of the point where the work is separated, as may be seen from FIG. 2, it cannot displace relatively to the tool and damage same during the cutting.

The cam 14 is shorter than the cam 24 so that following the separating of the work the lever 17 leaves the cam 14 and allows the arm 12 with the cutting tool 10 to return to inoperative position under the action of the spring 16 and only thereupon the lever 25 leaves the cam 24, whereby the work clamping mechanism is relaxed and its parts are moved by the spring 29 to release the work. The piece separated from the work is removed and the carriage 1 with the auxiliary carriage 7 is returned by the chain drive 3 to its initial position.

What I claim is:

1. An apparatus for cutting a continuously fed elongate workpiece, comprising a frame, a main carriage mounted on the frame for movement in the direction of the workpiece axis, means for moving said main carriage in synchronism with the work feed, an auxiliary carriage mounted on said main carriage for reciprocating movements parallel to the workpiece axis, spring means resiliently mounting said auxiliary carriage in said main carriage and urging the auxiliary carriage in one direction parallel to the work piece axis while permitting compensating movement therein in the opposite direction, a clamping mechanism on said auxiliary carriage including a jaw fixed to the auxiliary carriage on one side of the workpiece, a counterwedge adjustably fixed to the auxiliary carriage, a second jaw in the form of a wedge on the other side of the workpiece and movable longitudinally along the counterwedge with the inclined surfaces of the wedges abutting, a linkage connected to said movable wedge and projecting toward the frame, a cam on said frame in the path of the linkage for actuating the latter, a cutting tool tiltably supported on said auxiliary carriage for movement toward the workpiece in a direction transverse to the direction of the work feed, means for driving said cutting tool to cut the workpiece mounted on said main carriage, and means for tilting the cutting tool into engagement with the work during the time in which said cam has actuated the linkage to clamp the workpiece to the auxiliary carriage.

2. In an apparatus for working on a moving, elongated workpiece in a direction perpendicular to the work feed having a flying cutting unit mounted on a main carriage movable to and fro in a direction of the feed of the material to be cut and the speed of which is increased from zero to the speed of the material to be cut, said cutting unit including a cutting tool arranged to swivel in the cutting direction perpendicular to the work feed, means for driving the cutting tool to cut the workpiece and a clamping device firmly mounted to the cutting unit for clamping the work firmly with the unit at least for the time of the actual cut, the improvement comprising an auxiliary carriage slidably mounted on said main carriage to move parallel to the movement of the main carriage, means for yieldably pressing said auxiliary carriage in the work feed direction against a stop on the main carriage, and means for supporting said clamping device and cutting tool on said auxiliary carriage, said means for driving the cutting tool being mounted on said main carriage.

3. In an apparatus for working on an elongated moving workpiece the improvement according to claim 2 wherein said means for yieldably pressing the auxiliary carriage comprises pressure springs supported by the main carriage for urging the auxiliary carriage against said stop.

4. In an apparatus for working on an elongated moving workpiece, the improvement according to claim 2 wherein said clamping device comprises cooperating jaws, one of which is a bar on one side of the workpiece, and the other of which is a longitudinally movable wedge, and an adjustable counterwedge along which said wedge moves.

References Cited in the file of this patent

UNITED STATES PATENTS

| | | |
|---|---|---|
| 1,493,974 | Englert | May 13, 1924 |
| 1,592,009 | Simpson | July 13, 1926 |
| 2,209,995 | Morris | Aug. 6, 1940 |
| 2,293,260 | Johnston | Aug. 18, 1942 |
| 2,366,243 | Edwards | Jan. 2, 1945 |
| 2,582,025 | Frank | Jan. 8, 1952 |

FOREIGN PATENTS

| | | |
|---|---|---|
| 737,087 | Great Britain | Sept. 21, 1955 |